Figure 1:
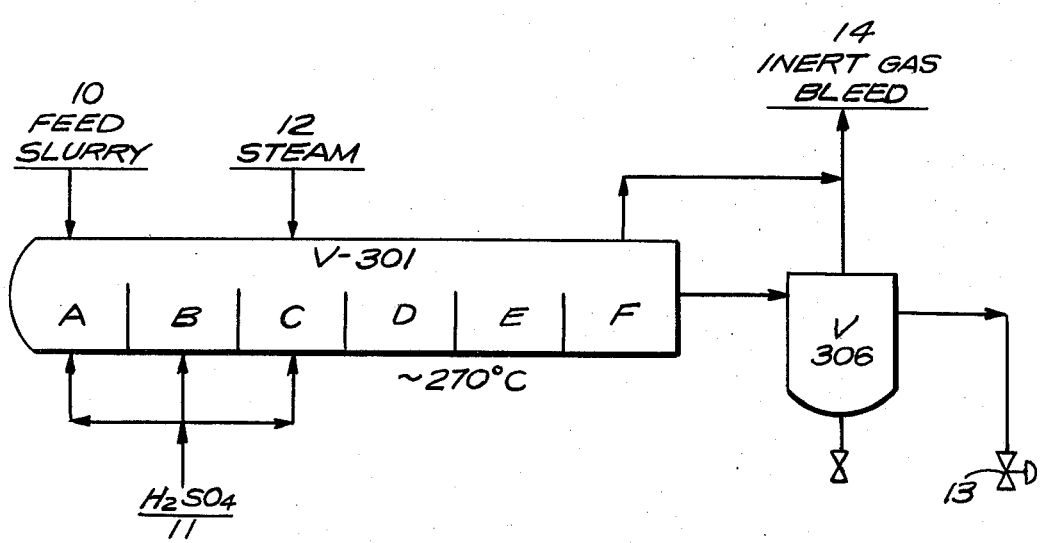

United States Patent [19]

Lussiez et al.

[11] 4,374,101
[45] Feb. 15, 1983

[54] CHEMICAL DISSOLUTION OF SCALE FORMED DURING PRESSURE LEACHING OF NICKELIFEROUS OXIDE AND SILICATE ORES

[75] Inventors: Guy W. Lussiez, Golden; Mahesh C. Jha, Arvada, both of Colo.

[73] Assignee: Amax Inc., Greenwich, Conn.

[21] Appl. No.: 390,441

[22] Filed: Jun. 21, 1982

[51] Int. Cl.³ .................. C01G 53/00; C23F 14/02
[52] U.S. Cl. ........................... 423/150; 203/7; 252/80; 75/119; 134/3
[58] Field of Search ............ 423/150; 203/7; 252/80; 75/119; 134/3, 41

[56] References Cited

U.S. PATENT DOCUMENTS 3,991,159 11/1976 Queneau et al. ............... 423/150
4,098,870 7/1978 Fekete et al. .................. 423/150

OTHER PUBLICATIONS

Ratner, Z. L. et al, "Removal of Deposits From Autoclaves After the Sulfuric Acid Leaching of Oxidized Nickel Ores at the MOA Plant", (Gos. Inst. Proekt. Predpr. Nikelevoi Prom), 1969, USSR No. 42, 43-53, Abstracted in Chem. Abs. vol. 75-24,119v.

Boldt, Joseph R. Jr., *The Winning of Nickel*, Longsmans Canada Limited, Toronto, Canada, 1967.

*Primary Examiner*—O. R. Vertiz
*Assistant Examiner*—Robert L. Stoll
*Attorney, Agent, or Firm*—Michael A. Ciomek; Eugene J. Kalil

[57] ABSTRACT

In the high-pressure sulfuric acid leaching of nickeliferous oxide and silicate ore, there is a tendency for the formation of scale on autoclave surfaces. The scale comprises oxides and sulfates of metals selected from the group consisting of aluminum, iron, silicon and magnesium. The scale is chemically removed by flushing the autoclave following completion of a leaching regime with a sulfuric acid solution containing about 20 to 100 gpl $H_2SO_4$ at a temperature of about 150° C. to 250° C. and a pressure ranging from about 54 psig to 562 psig for a time sufficient to effect substantial removal of the scale.

4 Claims, 2 Drawing Figures

CHEMICAL DISSOLUTION OF SCALE FORMED DURING PRESSURE LEACHING OF NICKELIFEROUS OXIDE AND SILICATE ORES

This invention relates to the leaching of nickeliferous oxide and silicate ores and, in particular, to the chemical removal of scale from autoclave surfaces following high pressure leaching of said ores.

STATE OF THE PRIOR ART

Methods are known to recover nickel and cobalt from nickeliferous oxide and silicate ores. One method, which is referred to as the Moa Bay process, comprises pulping the nickel ore (95% passing 325 mesh) to approximately 40% solids, and then selectively leaching the nickel and cobalt with sulfuric acid at elevated temperature and pressure (e.g., 475° F. [245° C.] and 525 psig) to solubilize about 95% each of the nickel and cobalt. The leached pulp is cooled and then washed by countercurrent decantation, with the washed pulp going to tailings. The acidic solution is then neutralized with coral mud to a pH of about 2.5 to 2.8 and the thus-treated product liquor (containing generally about 4 to 6 grams of nickel per liter) is subjected to sulfide precipitation by preheating the leach liquor and carrying out the precipitation with $H_2S$ in an autoclave at about 250° F. (121° C.) and a pressure of about 150 psig. Usually, nickel sulfide seed is added at the feed end to assure substantially complete precipitation of the nickel and cobalt.

A problem in the leaching of lateritic ore is the tendency of scale formation on the walls of the autoclave which must be considered in the design of the high pressure leach system. This is particularly the case with the Moa Bay process. The formation of alunite and hematite deposits on autoclave walls has been well documented by Russian authors describing the Moa Bay operation [R. A. Chaves, V. V. Karelin and Sobolew, *Tsvet Metally*, 9(4), 4 (1968)]. According to the publication, the walls of the autoclaves and of the pipelines tend to be covered with a thick scale layer (upwards of 20 cm.).

Formation of such deposits adversely affect process continuity which requires a forced shutdown about once a month in order to clean the autoclaves and the pipelines which takes 5 to 7 days.

In Chemical Abstracts (75-24119V), reference is made to a paper entitled "Removal of Deposits From Autoclave After $H_2SO_4$ Leaching of Oxidized Nickel Ore at The Moa Plant" (Trudy Proektnogo I. Nauchno - Issledovatelskogo Instituta "Gipronikel") which states that scale deposits of mostly iron and aluminum sulfate are formed during the $H_2SO_4$ leaching of nickel oxide ores which rapidly fill the main autoclave and heat exchange equipment. The leaching operation must subsequently be stopped for cleaning which results in a decrease in plant efficiency. Attempts at chemically removing the scale using sulfuric acid were not successful in that $H_2SO_4$ effected only partial dissolution of the deposits. The use of sodium hydroxide solutions at temperatures of 130° C. or 190° C., depending on concentration, appeared to be more successful. However, this may subject exposed metal surfaces to caustic embrittlement.

An improved method for minimizing scaling during acid leaching is that disclosed in U.S. Pat. No. 4,098,870 wherein the acid addition is made in stages. However, some scale still forms. When the ore being leached is predominantly limonite, that is, high in iron content, but low in both magnesium and silicon, the scale which forms is basically hematite. On the other hand, when the ore is predominantly garnierite or saprolite type, that is, high in magnesium and silicon, but low in iron, the scale which forms comprises magnesium sulfate and silica with a small amount of iron and nickel. The aluminum in the ore also becomes part of the scale as alunite which is a basic sulfate. Hematite-alunite type scale is hard and adheres tenaciously to the walls of the autoclave.

Generally speaking, descaling techniques involve the use of mechanical devices (hammer, spatulas, etc.). Such techniques are tedious on titanium-clad autoclaves in that the titanium cladding is thin and extra care must be taken to avoid damage to the cladding.

It would be desirable to provide a method for removing scale easily and simply, while avoiding prolonged downtime of the autoclaves and damage to the walls of the autoclave. This can be accomplished by dissolving the scale in a solution which is not expensive and which does not adversely affect the physical and mechanical properties of titanium cladding or other exposed metal surfaces.

OBJECT OF THE INVENTION

It is an object of the invention to provide a chemical method for removing scale from autoclave walls formed during high pressure leaching of lateritic ores.

Figure 2:
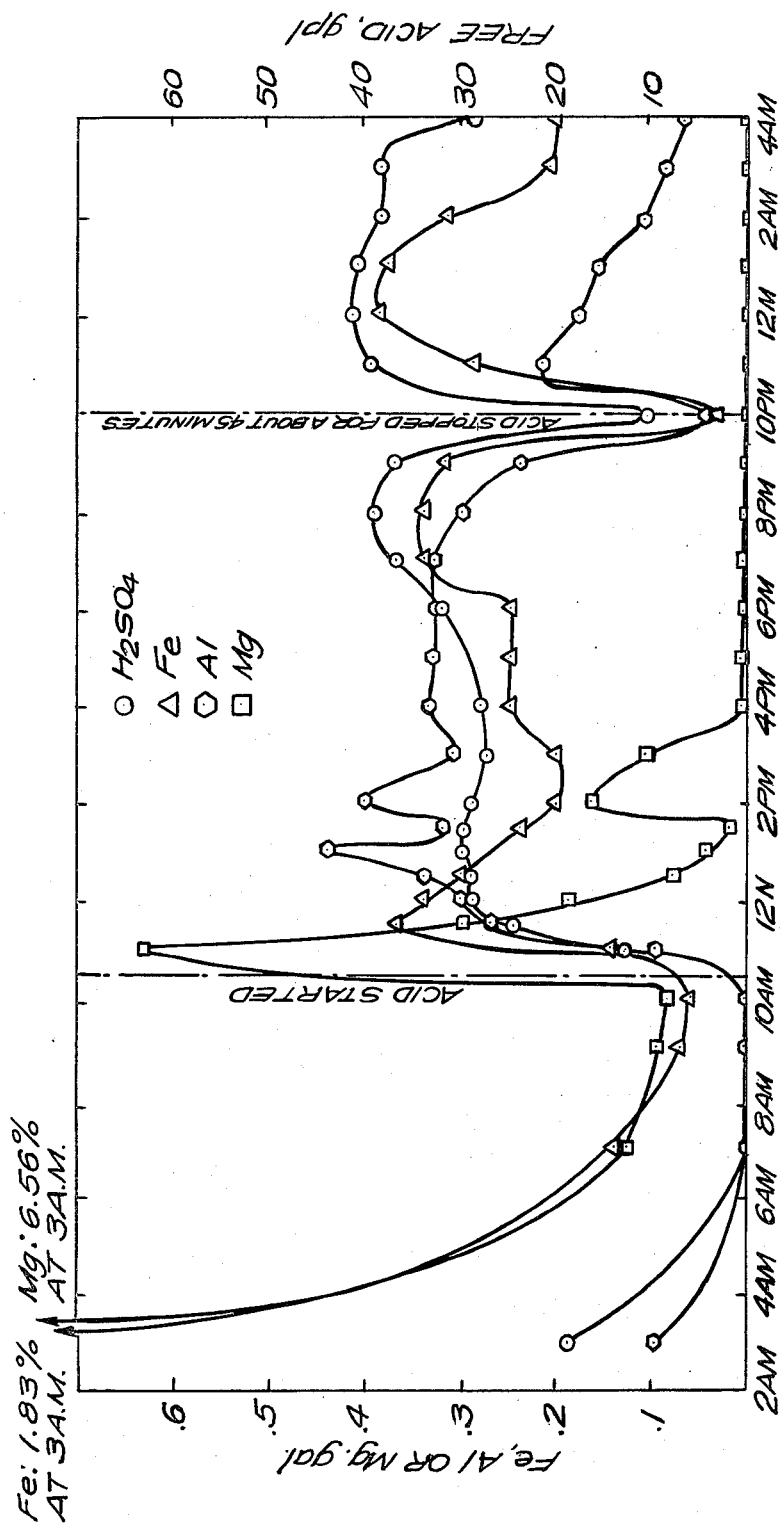

Other objects will more clearly appear when taken in conjunction with the following disclosure, claims, and the drawings, wherein:

FIG. 1 is a schematic of a high-pressure leach vessel including a level-control pot which may be employed in carrying out one embodiment of the invention; and FIG. 2 is a dissolution profile of scale containing Fe, Al and Mg as a function of time.

STATEMENT OF THE INVENTION

In its broad aspects, the invention is directed to a method for chemically removing scale from autoclave surfaces formed during the high pressure leaching of nickeliferous laterite ore containing, in addition to nickel, oxides and silicates of aluminum, iron, magnesium and chromium. The scale is comprised of oxides and sulfates of such metals as iron, aluminum, magnesium, nickel and silicon. The main reason for the scale formation is the limited solubility of the foregoing compounds in relatively concentrated leach liquors at high leach temperatures. Leach liquors generally contain significant concentrations of metal sulfates (about 25 to 150 grams/liter) and moderate concentrations of acid (about 20 to 40 grams/liter). Such solution compositions tend to cause precipitation of oxides and sulfates of iron, aluminum and magnesium, particularly at high leaching temperatures, e.g., 240° C. and above.

If, on the other hand, a scale sample contacts a solution which contains only small concentrations of metal sulfates, for example, less than about 25 to 50 grams/liter, but relatively high concentrations of sulfuric acid (e.g., 20 to 100 grams/liter), the metal oxides and sulfates present in the scale are dissolved by the acid solution, particularly at temperatures lower than those employed in the leaching of ore. Very high acid concentrations, such as 200 grams/liter or more, should be avoided to protect exposed metal surfaces as well as to minimize cost.

While the solubility of several metal sulfates and oxides of interest increase as the temperature is decreased from above 250° C. to 200° C. and below, much lower temperatures (e.g., below 150° C.) should be avoided in that such temperatures slow down the kinetics of scale dissolution considerably.

In commercial practice, the scale formed is removed by flushing the autoclave with a sulfuric acid solution containing about 20 to 100 gpl of sulfuric acid, e.g. about 20 to 60 gpl acid, at temperatures ranging from about 150° C. to 250° C. (e.g., 180° C. to 225° C.) at a pressure ranging from about 54 to 562 psig for a time at least sufficient to effect substantial removal of the scale. In one test based on leaching a blend of ore assaying 1.7% Ni, 0.1% Co, 37% Fe, 0.45% Mn, 1.4% Cr, 2.2% Al, 6.5% Mg and 17% $SiO_2$, the scale formed was substantially removed after flushing the autoclave for about 17 hours at 200° C. with an acid solution containing about 30 to 40 gpl $H_2SO_4$. Prior to leaching with acid, water was first passed through the autoclave at 200° C. for 7 hours. At the end of the treatment with water, the sulfuric acid was started at a free acid concentration of about 30 to 40 gpl $H_2SO_4$ and continued for 17 hours until the effluent acid returned to its free acid concentration of 30 to 40 gpl which indicated that the test was completed. About 11 hours after the acid treatment was started, the acid was shut off for about 45 minutes before being resumed.

Upon completion of the test, the autoclave and the letdown system were opened for inspection and found to be very clean. Exposed titanium could be seen throughout the equipment and no further descaling was necessary.

DETAILS OF THE INVENTION

The proposed method of chemical descaling is based on the dissolution of scale in dilute acid, for example, 20 to 60 grams/liter, at temperatures ranging from about 180° C. to 225° C. and a pressure of about 130 to 355 psig. Bench scale tests were employed in which pieces of scale, taken from the walls of a commercial high pressure leaching autoclave, were leached with an acid solution containing 30 or 35 grams/liter sulfuric acid at 200° C. in a 2-liter titanium autoclave. The details of three such tests are presented in Examples 1, 2 and 3 which show the varied compositions of different types of scale corresponding to the leaching of laterite ore of varied iron and magnesium contents. It will be clearly apparent from Examples 1, 2 and 3 that the method of the invention is effective in dissolving all types of scales, although the time requirement is longer for the hematite-alunite scale. It should be noted that while the magnesium sulfate type scale was dissolved in 6 hours, it took 60 hours to dissolve 93% of the hematite-alunite scale.

The process was also demonstrated on a commercial scale as shown in Example 4.

EXAMPLE 1

During high-pressure sulfuric acid leaching of a high magnesium garnierite type ore, a scale was formed that analyzed 4.6% Ni, 11.6% Mg, 6% Fe and 0.9% Al. A 30-gram sample of this scale was heated with 300 ml of 30 gpl $H_2SO_4$ solution at 200° C. in a 2-liter titanium autoclave. After 6 hours, the autoclave was depressurized and opened. The remaining scale was removed, washed, dried and weighed. The weight of the residual scale was 4 grams, thus indicating approximately 90% dissolution of the scale.

EXAMPLE 2

When a high-iron limonite type ore was subjected to high pressure sulfuric acid leaching, an alunite type scale was formed comprising 16.1% Al, 0.25% Ni and 0.48% Mg. A sample of this scale was leached with 35 gpl $H_2SO_4$ at 200° C. After 6 hours, the residual scale was releached under similar conditions. After two such releaches, that is, after a total leaching time of 18 hours, about 80% of the hard alunite type scale had been dissolved.

EXAMPLE 3

Another hematite-alunite type scale obtained after leaching high-iron, low-magnesium limonite type ore analyzed 16.9% Al, 6.4% Fe, 0.1% Ni, and 0.01% Mg. A 30-gram piece of the scale was leached and releached as in Example 2. The solution contained 35 gpl $H_2SO_4$ and the leaching temperature was 200° C. A total of ten tests were conducted, each of 6-hour duration. The weight of the residual scale and the cumulative extent of dissolution after each test is given below:

| Test No. | Cumulative Leaching Time, Hrs. | Weight of Residual Scale | Cumulative Dissolution (%) |
|---|---|---|---|
| 1 | 6 | 27.2 | 9 |
| 2 | 12 | 23.3 | 22 |
| 3 | 18 | 19.9 | 34 |
| 4 | 24 | 16.4 | 45 |
| 5 | 30 | 13.5 | 55 |
| 6 | 36 | 10.3 | 66 |
| 7 | 42 | 8.5 | 72 |
| 8 | 48 | 5.5 | 82 |
| 9 | 54 | 3.7 | 88 |
| 10 | 60 | 2.0 | 93 |

The foregoing results indicate the effectiveness of the chemical dissolution method of the invention, even for the hard-to-dissolve hematite-alunite scale.

To demonstrate the method of the invention in effecting the chemical dissolution on commercial scale, an ore blend assaying 1.7% Ni, 0.1% Co, 37% Fe, 0.4% Mn, 1.4% Cr, 2.2% Al, 6.5% Mg and 17% $SiO_2$ was used. The ore was first slurried in water to a pulp density of about 33% solids and the slurry 10 fed to compartment A (see FIG. 1) of the multistage autoclave V-301 containing serially connected compartments A to F.

The acid was fed at an acid-to-ore ratio of about 0.5 to 0.55 by weight by distributing the total amount of acid 11 to compartments A, B and C at a distribution ratio of 60%, 25% and 15%, respectively in accordance with U.S. Pat. No. 4,098,870. The leaching campaign was carried out for a total of about 11 days and 8 hours at a temperature of about 270° C. and an elevated pressure of about 784 psig. The total solids output during the leaching campaign averaged about 16 mt/day (metric tons/day). The temperature was maintained by feeding steam 12 as shown.

Upon completion of the leach campaign, water was then pumped through the autoclave to bring the temperature down from 270° C. to 200° C. Upon reaching the 200° C. temperature, water was passed through the autoclave for about 7 hours while maintaining the temperature at 200° C. at an estimated rate of about 800 kg/hr, the actual rate not having been measured. During the seven-hour water treatment, the low % solids slurry coming out of the letdown system was sampled, filtered and assayed for magnesium, aluminum, iron and $H_2SO_4$.

Acid and water were thereafter fed at an average rate of 34 kg/hr and 900 kg/hr respectively, to provide an acid concentration of about 40 gpl for about 17 hours, the effluent flowing out of the let-down stages being about 720 kg/hr. The temperature was maintained at 200° C.

The average elemental concentration in the effluent solution was as follows for the whole run:
Mg—0.19 gpl or 2.8 kg as sulfate
Al—0.25 gpl or 19.0 kg as sulfate
Fe—0.28 gpl or 12.0 kg as sulfate The assay of the solution during the descaling period will be apparent by referring to FIG. 2. Reading from left to right, it will be noted that during the flush-out with water for about 7 hours (from about 3 A.M. to 10 A.M.), the amount of magnesium and iron together with aluminum dissolved or removed from the scale dropped quickly as the 7th hour (10 A.M.) was approached.

However, when acid and water were added to provide an acid concentration of about 40 gpl, the dissolution of the scale markedly increased between the 7th hour (10 A.M.) and the 19th hour (10 P.M.) as evidenced by the increased loading of the acid solution with the elements magnesium, aluminum and iron accompanied by a corresponding drop in free acid.

Referring to FIG. 2, starting at the left hand side, it will be noted that part of the magnesium and the iron dissolved during the 7-hour flush-out with water.

As soon as the acid was started, at about 10 A.M., the concentration of all three elements in the liquor exiting the autoclave substantially increased. Magnesium concentration was down to zero after about six hours (4 P.M.), but aluminum and iron concentrations were still fairly high at the end of the test. During the 45 minutes when the acid flow was interrupted (starting at 10 A.M.) the concentration of all elements dropped to a very low level (see FIG. 2).

Visual observation after the test, showed that chemical descaling with $H_2SO_4$ at 30–40 gpl and 200° C. was efficient.

During the test with water alone, as stated above, the exact flow rate of water was not measured and, therefore, the amount of scale dissolved could not be calculated; whereas, during the test with acid, the flow rate was known and based on elemental concentrations, it was calculated that about 34 kg of aluminum, iron and magnesium sulfates were dissolved. This does not include the solids that were continually discharged with the solution during the entire test. It is very likely that some soluble sulfates act as a cement for the less soluble sulfates that come loose when the cement is dissolved.

In instances where individual autoclaves were connected by pipes, the pipe between the first and second autoclaves often was too restricted with scale to carry out the foregoing operation. However, a simple water flush at 200° C. cleared the pipe of scale which was apparently magnesium sulfate which is easily soluble in water. The less soluble scale was dissolved with acid (30 gpl $H_2SO_4$ at 220° C.).

The preferred operating conditions (200° C., 30–40 gpl $H_2SO_4$) were chosen according to magnesium solubility and to insure that the titanium would not be attacked. Titanium assays were run on the solution exiting the autoclave. Titanium concentration was below the detectable level of 1 ppm. The selected conditions were conservative, and it is possible that other conditions would give faster dissolution of the scale.

The let-down system (flash pots) was also quite clean after the test. It was noted that silica scale in the let-down system did not have to be mechanically removed.

The tests indicated that chemical descaling is less time-consuming than mechanical descaling (which normally took a minimum of four days) and safer for the titanium cladding. However, the type of scale obtained depends on the kind of laterite ore that is leached and thus it is expected that the time for chemical dissolution of the scale will vary with the kind of lateritic ore treated.

Generally speaking, the method of the invention is applicable to the chemical removal of scale formed on autoclave surfaces in the leaching of nickel laterite ores having the following composition: up to 5% Ni, up to 1% Co, up to 10% Cr, up to 10% Mn, up to 1% Cu, up to 1% Zn, up to 25% Si, up to 55% Fe, up to 10% Al, up to 30% Mg, substantially the balance being combined oxygen. The temperature for chemical dissolution may be as low as 150° C. and range upwards to about 250° C. at a pressure of about 54 psig to 562 psig.

Although the present invention has been described in conjunction with the preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a method for the sulfuric acid leaching of nickeliferous oxide and silicate ore, containing in addition to nickel, oxides and silicates of aluminum, iron and magnesium, wherein during high pressure leaching of nickeliferous oxide feed material in an autoclave at a temperature in the range of about 180° C. to 300° C., there is a tendency for the formation of scale on autoclave surfaces, the scale containing oxides and sulfates of metals selected from the group consisting of aluminum, silicon, iron and magnesium, the improvement which comprises, flushing said autoclave following completion of a leaching regime with a sulfuric acid solution containing about 20 to 100 gpl $H_2SO_4$ at a temperature of about 150° C. to 250° C. and a pressure ranging from about 54 psig to 562 psig for a time at least sufficient to effect substantial removal of said scale.

2. The method of claim 1, wherein the sulfuric acid solution employed for chemically removing the scale contains from about 20 to 60 gpl $H_2SO_4$.

3. The method of claim 1, wherein the temperature of the sulfuric acid solution employed for chemically removing the scale ranges from about 180° C. to 225° C.

4. In a method for the sulfuric acid leaching of nickeliferous oxide ore, containing in addition to nickel, oxides of aluminum, iron and magnesium, wherein during high pressure leaching of nickeliferous oxide and silicate feed material in an autoclave at a temperature in the range of about 200° C. to 280° C., there is a tendency for the formation of scale on autoclave surfaces, the scale containing oxides and sulfates of metals selected from the group consisting of aluminum, silicon, iron and magnesium, the improvement which comprises, flushing said autoclave following completion of a leaching regime with a sulfuric acid solution containing about 20 to 60 gpl $H_2SO_4$ at a temperature of about 180° C. to 225° C. and a pressure ranging from about 130 psig to 355 psig for a time at least sufficient to effect substantial removal of said scale.

* * * * *